Feb. 13, 1951 J. D. GAYER 2,541,235
FAN ARRANGEMENT FOR ELECTRICAL DEVICES
Filed July 23, 1949 2 Sheets-Sheet 1
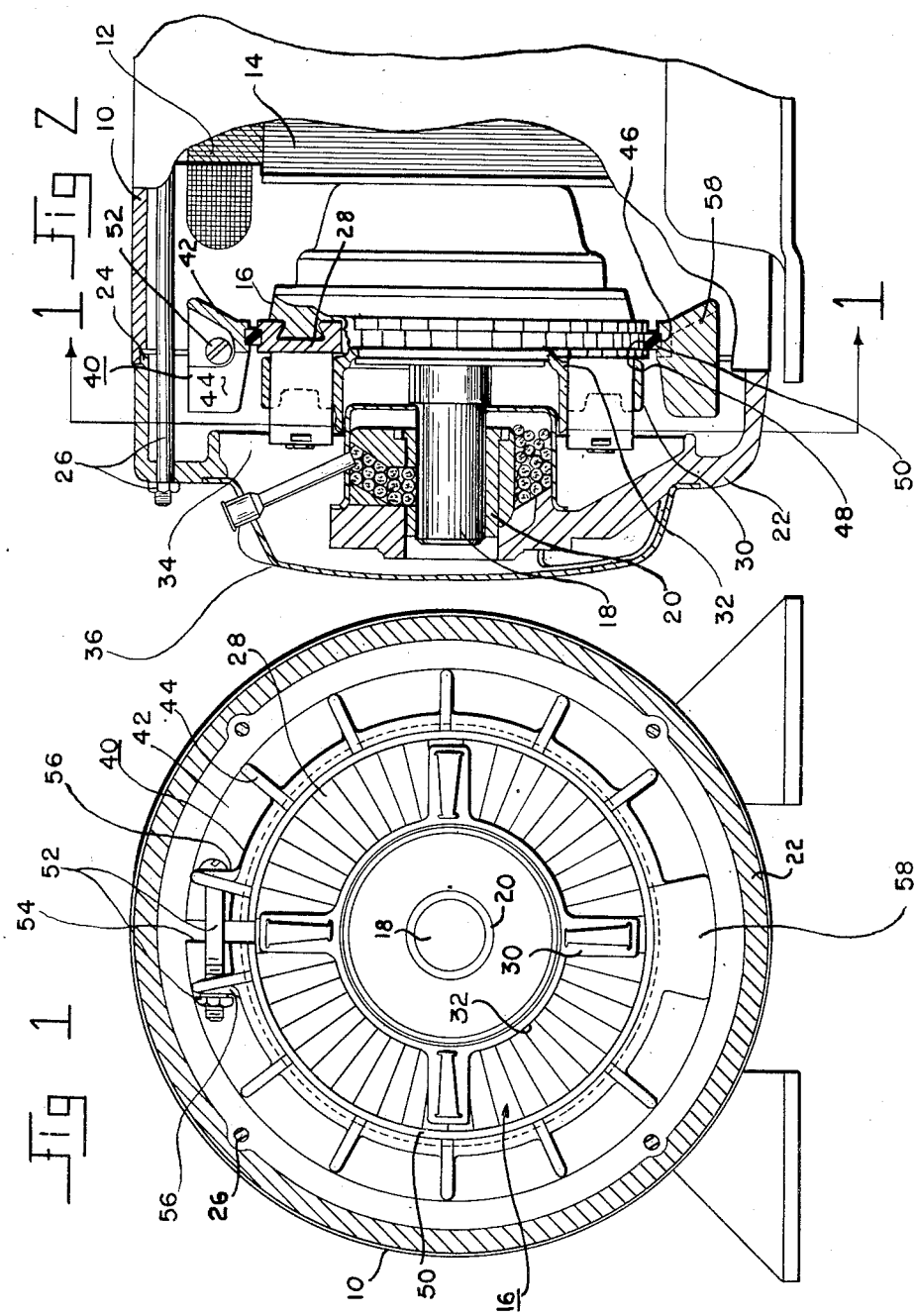
INVENTOR
JOHN D. GAYER
BY
Toulmin & Toulmin
ATTORNEYS Feb. 13, 1951 J. D. GAYER 2,541,235
FAN ARRANGEMENT FOR ELECTRICAL DEVICES
Filed July 23, 1949 2 Sheets-Sheet 2

INVENTOR
JOHN D. GAYER
By Toulmin & Toulmin
ATTORNEYS

Patented Feb. 13, 1951

2,541,235

UNITED STATES PATENT OFFICE 2,541,235

FAN ARRANGEMENT FOR ELECTRICAL DEVICES

John D. Gayer, Dayton, Ohio, assignor to The Brown-Brockmeyer Company, Dayton, Ohio, a corporation of Ohio Application July 23, 1949, Serial No. 106,431

5 Claims. (Cl. 171—320)

1

This invention relates to electrical apparatus, such as electric motors and generators.

Most electric motors and generators, and similar rotary electrical apparatus include means for circulating air through the motor frame in order to maintain the windings and commutator cooled to within the allowable limits of temperature rise. Ordinarily, the fan on such a device is mounted on the shaft at the end of the motor opposite the commutator and is of the centrifugal type so that air is drawn into the motor housing at the end opposite the commutator and then driven through the motor and discharged therefrom in the commutator end.

While such an arrangement for the fan is generally satisfactory so far as movement of air through the motor is concerned, it introduces certain other disadvantages which it is desirable to eliminate. For example, the fan occupies a substantial amount of axial space within the motor, and the motor must, accordingly, be manufactured of sufficient length to allow room for the fan to be mounted therein.

In order to maintain the length of the motor at a minimum and still include the fan therein at the end opposite the commutator, the fan is quite often made of a small enough diameter to fit within the end housing of the motor and, therefore, is less efficient and moves less air than a fan of larger diameter would.

The shaft projection of the armature of the motor is usually at the end thereof opposite the commutator, and, if the fan is also mounted at that end, it is located so that it is apt to draw in air that is laden with foreign material which may accumulate within the motor housing and decrease the efficiency of the cooling thereof, and which may even be harmful to the windings.

After a fan is mounted on an armature, the said armature is balanced, and this balancing generally requires adjusting the weight at each end. When the fan is mounted on the end opposite the commutator end, adjusting the weight at said commutator end is quite difficult, because there is no place to add balancing weights or to drill counterbalancing recesses. However, when the fan is mounted at the commutator end, this difficulty is avoided, and the weight distribution at the commutator end of the armature is as readily adjusted as at the other end.

The principal object of the instant invention is to provide a fan arrangement for a motor or generator which eliminates substantially all of the drawbacks referred to above in connection with conventional type cooling fans.

2

It is a still further object of this invention to provide a novel type fan for an electric motor or generator which is simpler to install than the conventional type fans of the prior art.

A further object of this invention is the provision of a fan arrangement for rotating electrical apparatus, such as motors or generators, which is highly efficient in operation and provides better cooling than fans constructed according to the prior art.

Still another object is a provision of a motor construction involving a novel fan arrangement which is more inexpensive than conventional constructions and which is more compact.

Another object of this invention is the provision of a fan for rotary electrical apparatus having a current collector which is carried directly by the collector.

These and other objects and advantages will become more apparent upon reference to the following description taken in connection with the accompanying drawings, in which:

Figure 1 is a sectional view through a motor constructed according to this invention and is indicated by line 1—1 on Figure 2;

Figure 2 is a side view looking in from the right side of the motor shown in Figure 1 and partly in section;

Figure 3:
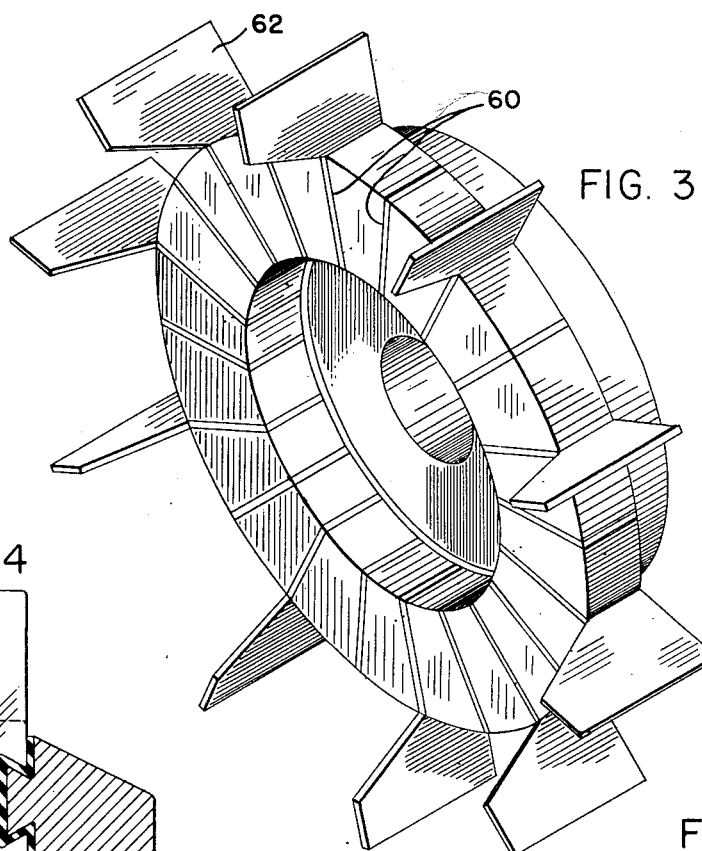
Figure 3 is a perspective view showing how a fan can be made according to this invention by radially extending some of the insulating segments of the commutator.

Referring to the drawings somewhat more in detail, the apparatus shown therein is an electrical motor, but it will be understood that this invention is equally applicable to generators, phase shifters, and other types of rotary electrical apparatus as well. Accordingly, the use of the word "motor" throughout this application is intended to be a generic term and not to be taken as limiting this invention in any way whatsoever.

The motor illustrated comprises a frame or housing 10, and within which is mounted in the customary manner a stator 12 comprising the usual laminated magnetic part and the electrical windings thereon.

Rotatably mounted with the stator 12 is the laminated rotor 14, and this rotor is a wound rotor, as shown, and which has mounted on one end thereof a current collector, such as the commutator structure 16. The rotor 14 and the commutator 16 are supported on the usual shaft 18 which is received in a journal 20 in end frame 22 fitting on the end of stator frame 10, as by the tenon 24, and retained in position as by the through bolts and nuts 26.

The construction of the end frame 22 and supporting bearing 20 for shaft 18 and commutator 16 is substantially conventional and no detailed description thereof is believed necessary. However, it may be pointed out that the preferred type commutator to be employed in connection with this invention is one having the segments thereof radially disposed, as indicated by the reference number 28. The brushes for the motor are then axially disposed and are slidable in brush pockets 30 carried by a brush ring 32. The arrangement illustrated is that of a brush lifter type motor, but it will be understood that this invention is equally adaptable to the type motor wherein the brushes remain on the commutator at all times, as, for example, in connection with direct current apparatus, or in connection with the conventional type series, shunt, compound, or repulsion start-induction run motors. Also, as will be seen, this invention is applicable to commutators having axial segments.

The end frame 22 of the motor is suitably apertured, as at 34, for admitting cooling air to the interior of motor frame 10, and these apertures 34 are preferably shielded by a dish-shaped canopy or cover member 36 suitably retained on end frame 22 in any desired manner.

According to this invention, the cooling fan for the motor is mounted at the commutator end thereof and is, in fact, supported directly on the commutator, or even is a part of the commutator. This permits the fan to be made of the largest possible diameter, eliminates the use of a baffle plate therefor, and promotes more efficient cooling of the commutator, because the air drawn into the motor enters the motor frame at the commutator end. In addition, the air is drawn into the motor from the end remote from the shaft extension of the motor and is, thus, cleaner than if it were drawn from the other end.

Reference to Figures 1 and 2 will reveal that in this modification the fan 40 takes the form of a split annular member of a size to fit over the outer periphery of commutator 16 with a clearance between. The fan comprises a backing ring part 42 and a plurality of blades 44 outstanding axially from the backing ring and of substantial radial extent.

The inner periphery of backing ring 42 is annularly grooved, as indicated by reference number 46, and the outer periphery of commutator 16 is similarly annularly grooved, as indicated at 48. The purpose of grooves 46 and 48 is to receive a split ring of insulating material, such as a phenolic substance which isolates the fan from the individual segments of the commutator. This insulating ring is indicated in Figures 1 and 2 at 50, and it will be seen to provide effective radial spacing of the fan from the commutator around the entire periphery of the latter.

As mentioned before, fan 40 is in the form of a split ring, and it is clamped about the commutator by means of a clamp screw and nut 52, as indicated at the top of Figure 1. The clamp screw extends through the fan blades 44 that are disposed on opposite sides of the split 54 in the fan ring, and there may be provided raised bosses 56 on the said fan blades to provide plane bearing surface for the head of the screw and nut, if so desired.

To reduce the amount of balancing required after the fan is mounted on the commutator of the rotor or armature, the said fan ring may comprise the counterbalancing part 58 which will be seen in Figure 1 to be exactly opposite the split 54. The provision of counterbalancing part 58 provides for a rough balancing of the fan so that a minimum of balancing is required after it is assembled with the armature or rotor.

The preferred manner of forming the fan ring is by casting, and it has been found that a cast aluminum is highly satisfactorily for this purpose. In addition to the cast aluminum being light, it provides good structural strength and is easy to work, whereby the fan and rotor can readily be balanced after assembly by drilling spots in the backing ring 42 in the customary manner. Aluminum is also nonmagnetic and is, therefore, not subject to vibratory stresses set up by the pulsating field in the motor. This is of advantage in reducing noise in the motor and also prevents the fan from becoming fatigued.

While the end of the motor opposite the commutator 16 is not illustrated, it will be understood that by mounting the fan about the commutator, the space usually left at the said other end of the motor for the fan can be eliminated, and the entire motor frame shortened an appreciable amount. Also, since the fan merely comprises a relatively light ring of metal, the total motor weight is lighter when the fan of this invention is used than with a conventional type of fan.

Other advantages which obtain from the use of the fan of this invention, and which have been referred to previously, include the fact that the fan is positioned near the outside of the motor frame and is, therefore, highly efficient for moving air, and that the air drawn in by the fan comes from the clean end of the motor, rather than the working end thereof.

This air, in entering the motor, is drawn directly over the commutator and brushes and is highly efficient for cooling these elements. An incidental advantage which would obtain in connection with high speed motors and the like is that the fan ring and the insulating ring between it and the commutator give support to the commutator segments and counteract the effect of centrifugal force thereon so that the commutator is actually considerably stronger when encircled by a fan according to this invention than if it were constructed in the conventional manner.

Other forms which my invention may take are illustrated in Figures 3 through 6. In Figure 3 the fan is formed integrally with the commutator by extending certain of the insulating segments 60 between the current conducting segments, as indicated at 62. It will be apparent that by extending a number of the insulating segments both radially and axially, as shown, a fan action is provided when the rotor on which the commutator is mounted turns.

It will be understood that as many or as few of the segments could be extended as desired, and the particular number so extended will vary with the number of bars in the commutator and the type of service to which the motor is to be put.

Figure 4:
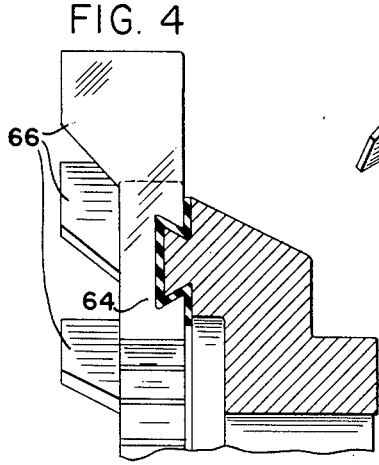
Figure 4 is a fragmentary section showing an arrangement like Figure 3 but with some of the current conducting bars extended to form the fan.

Figure 4 is a view showing an arrangement similar to that illustrated in Figure 3, except that Figure 4 shows several of the current conducting segments at 64 extended, as at 66, in order to provide the desired fan action. It will be observed that Figures 3 and 4 show substantially identical arrangements, when it is considered that the commutator consists of both metallic and nonmetallic segments and that in each case some of the segments are extended to provide fan blades.

Figure 5:
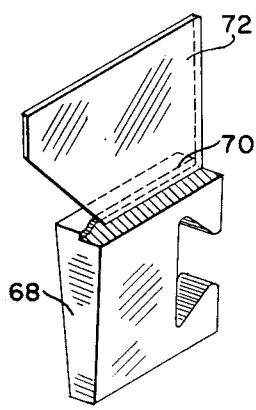
Figure 5 is a perspective view showing how a fan blade can be attached directly to a commutator segment, as by soldering.

Figure 5 illustrates still another form of my invention, wherein there is shown a segment 68 which has been slotted, as at 70, for receiving an individual fan blade 72 that is secured in slot 70, as by soldering. By the construction shown in Figure 5, the blades 72 can be formed of relatively thin metal, thus giving them strength, while the commutator itself remains substantially conventional.

Figure 6:
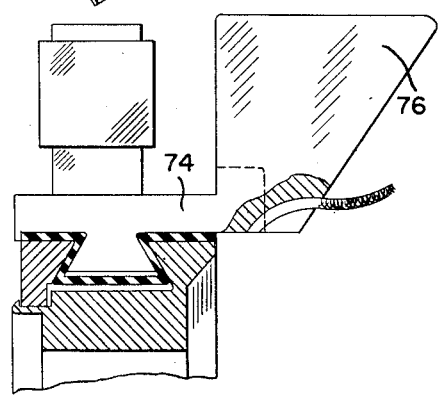
Figure 6 is a view like Figure 4, but showing how my invention can be adapted to a commutator of the axial segment type.

In Figure 6 there is illustrated the manner in which my invention can be applied to an axial segment type commutator, as by extending a number of the segments 74, as indicated at 76, or by securing individual fan blades to said segments, as illustrated in Figure 5.

To summarize briefly, my invention contemplates the provision of a fan at the current collector end of a piece of rotary electrical apparatus by mounting the fan in direct association with the said current collector, either by clamping a fan ring on the said collector, by forming the fan blades integrally with the collector, or by supporting individual fan blades directly on the collector.

It will be evident that certain other arrangements of the fan could also be made and still maintain it in direct intimate association with the commutator so far as the beneficial result of drawing the cooling air into the commutator motor is concerned. For example, most commutators and current collectors include a hub means on which the current conducting part of the collector is insulatingly mounted. The fan according to this invention could be carried by the hub and the blades of the fan overhanging the commutator about its outer periphery, substantially as they are illustrated in the drawings in this application.

In this particular arrangement of the invention it would be preferable to mount the fan prior to the connecting of the armature leads to the commutator, but these leads could readily be brought in between the blades of the fan and secured to the commutator in the usual manner.

It will be understood that this invention is susceptible to modification in order to adapt it to different usages and conditions, and, accordingly, it is desired to comprehend such modifications within this invention as may fall within the scope of the appended claims.

I claim:

1. In combination with an electric motor or the like having a stator and a rotor rotatable in said stator and having a radial bar commutator at one end; a fan ring mounted about the periphery of said commutator and radially spaced therefrom, a band of insulating material disposed between said fan ring and the periphery of said commutator, and means for clamping said fan ring against said insulating material whereby said fan ring is rigidly supported on said commutator, said fan ring comprising blades extending axially beyond the face of the said commutator.

2. In combination with a wound rotor of an electric motor and the like and having a radial bar type commutator; a band of insulating material extending about the periphery of said commutator, a ring extending around the outside of the said band of insulating material and clamped thereon so as to be rigidly supported by said commutator, said ring being of substantially the same axial extent as said commutator, and a plurality of fan blades extending radially and axially from said ring, said blades extending beyond the face of the commutator.

3. In combination with an armature for an electric motor or the like and having a radial bar type commutator; an annular groove formed around the periphery of said commutator and a split band of insulating material in said groove and projecting radially beyond the outer periphery of said commutator, a split fan ring having an inwardly opening groove therein adapted for receiving the outer edge of said band of insulating material, and means for drawing the ends of said fan ring together to clamp it and said band of insulating material tightly about said commutator, said fan ring comprising blades extending axially beyond the face of said commutator.

4. As a new article of manufacture; a fan ring especially adapted for mounting about the periphery of the commutator of an electric motor armature or the like, said fan ring comprising a split backing member of wide angle conical shape having fan blades extending therefrom on the convex side, screw threaded means for drawing the ends of said backing ring together and extending through the pair of said fan blades disposed on opposite sides of the split in said backing member, said fan ring including counterbalancing means carried thereby diametrically opposite said screw threaded means.

5. In combination with a commutator of the radial segment type; a band of insulating material around the periphery of said commutator, a split fan ring surrounding said band of insulating material, and means for clamping said ring against said band, said ring extending outwardly and backwardly from the periphery of the face of said commutator, and a plurality of fan blades extending forwardly from said ring to beyond the face of the commutator, thereby to induce a radial flow of air across the face of the commutator upon rotation thereof.

JOHN D. GAYER.

REFERENCES CITED

The following references are of record in the file of this patent:

UNITED STATES PATENTS

| Number | Name | Date |
|---|---|---|
| 828,867 | Stoltenberg | Aug. 14, 1906 |
| 837,033 | Bunet | Nov. 27, 1906 |
| 1,811,180 | Landers | June 23, 1931 |
| 2,460,752 | Jacobsen | Feb. 1, 1949 |

FOREIGN PATENTS

| Number | Country | Date |
|---|---|---|
| 12,889 | Great Britain | Of 1910 |
| 21,761 | Great Britain | Of 1908 |
| 395,758 | France | Jan. 6, 1909 |
| 199,933 | Germany | June 26, 1908 |
| 167,283 | Switzerland | May 1, 1934 |